(12) United States Patent
Maresca

(10) Patent No.: US 10,367,825 B2
(45) Date of Patent: Jul. 30, 2019

(54) METHOD AND SYSTEM FOR PARALLEL VALIDATION OF DOMAIN NAME SYSTEM SECURITY EXTENSION RECORDS

(71) Applicant: VERISIGN, INC., Reston, VA (US)

(72) Inventor: Paolo Maresca, Fribourg (CH)

(73) Assignee: VERISIGN, INC., Reston, VA (US)

( * ) Notice: Subject to any disclaimer, the term of this patent is extended or adjusted under 35 U.S.C. 154(b) by 289 days.

(21) Appl. No.: 15/392,170

(22) Filed: Dec. 28, 2016

(65) Prior Publication Data

US 2018/0183812 A1 Jun. 28, 2018

(51) Int. Cl.
*H04L 29/06* (2006.01)
*H04L 29/12* (2006.01)
*H04L 9/32* (2006.01)

(52) U.S. Cl.
CPC .......... *H04L 63/126* (2013.01); *H04L 9/3242* (2013.01); *H04L 9/3247* (2013.01); *H04L 61/1511* (2013.01); *H04L 61/1552* (2013.01); *H04L 63/08* (2013.01); *H04L 63/12* (2013.01)

(58) Field of Classification Search
CPC ....... H04L 63/126; H04L 63/08; H04L 63/12; H04L 9/3242; H04L 9/3247; H04L 61/1511; H04L 61/1552
See application file for complete search history.

(56) References Cited

U.S. PATENT DOCUMENTS

| | | | | |
|---|---|---|---|---|
| 9,130,917 B2* | 9/2015 | Smith | ................. | H04L 61/1511 |
| 9,894,041 B2* | 2/2018 | Norum | ................ | H04L 63/0428 |
| 9,961,110 B2* | 5/2018 | Blacka | ................ | H04L 61/1511 |
| 10,050,831 B2* | 8/2018 | Labrou | ............... | H04L 41/0816 |
| 2010/0034381 A1* | 2/2010 | Trace | .................. | H04L 63/0823 380/255 |

(Continued)

OTHER PUBLICATIONS

Jin et al., "An Advanced Client Based DNSSEC Validation and Preliminary Evaluations Toward Realization" 2016 International Conference on Information and Communication Technology Convergence (ICTC), IEEE, Oct. 19, 2016, pp. 178-183. (Year: 2016).*

(Continued)

*Primary Examiner* — Hee K Song
(74) *Attorney, Agent, or Firm* — MH2 Technology Law Group, LLP

(57) ABSTRACT

A parallelized method for authenticating and/or signing a DNS query using DNSSEC is disclosed. The method provides for obtaining, at a validating DNSSEC-aware DNS client, a DNS query for a resource record for a fully qualified domain name (FQDN); segmenting the FQDN into more than one specific sub-FQDN; providing, in parallel, a DNS query for a DNSSEC-related resource record for each of the more than one specific sub-FQDN to a respective authoritative name server or recursive resolver; obtaining, in parallel, the DNSSEC-related resource record for each of the more than one specific sub-FQDN; validating, in parallel, the DNSSEC-related resource record for each of the more than one specific sub-FQDN; combining each of the DNSSEC-related resource record for each of the more than one specific sub-FQDN; and verifying a chain-of-trust of the DNSSEC-related resource records.

20 Claims, 11 Drawing Sheets

(56) References Cited

U.S. PATENT DOCUMENTS

| | | | |
|---|---|---|---|
| 2010/0077462 A1* | 3/2010 | Joffe | H04L 63/126 726/5 |
| 2013/0036307 A1* | 2/2013 | Gagliano | H04L 9/321 713/171 |
| 2013/0173795 A1* | 7/2013 | McPherson | H04L 63/168 709/225 |
| 2016/0197898 A1* | 7/2016 | Hozza | H04L 63/0442 713/168 |
| 2017/0012943 A1* | 1/2017 | Kaliski, Jr. | H04L 63/0428 |
| 2017/0093802 A1* | 3/2017 | Norum | H04L 63/0428 |
| 2018/0034827 A1* | 2/2018 | Kaliski, Jr. | H04L 61/1511 |

OTHER PUBLICATIONS

Extended European Search Report dated May 22, 2018, European Application No. 17210933.2.
Yong Jin et al., "An Advanced Client Based DNSSEC Validation and Preliminary Evaluations Toward Realization" 2016 International Conference on Information and Communication Technology Convergnece (ICTC), IEEE, Oct. 19, 2016, pp. 178-183.
P. Wouters, "CHAIN Query Requests in DNS", RFC 7901, Internet Engineering Task Force (IETF), Jun. 22, 2016, pp. 1-16.

* cited by examiner

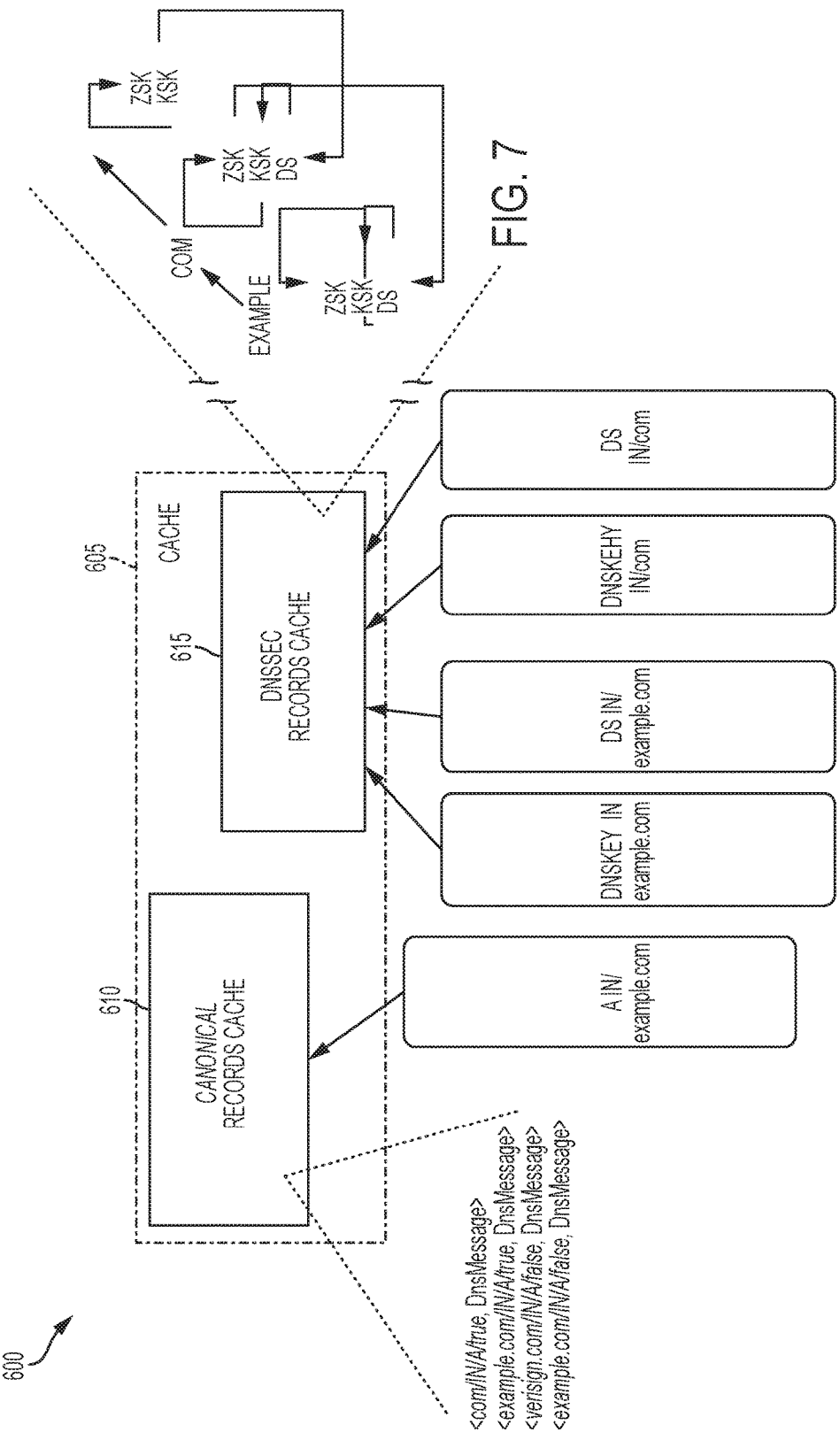

METHOD AND SYSTEM FOR PARALLEL VALIDATION OF DOMAIN NAME SYSTEM SECURITY EXTENSION RECORDS

FIELD

The present disclosure relates generally to domain name system ("DNS") security extensions ("DNSSEC"), and in particular to parallel validating and signing DNSSEC records.

BACKGROUND

DNSSEC is a suite of Internet Engineering Task Force (IETF) specifications for securing certain kinds of information provided by the DNS as used on Internet Protocol (IP) networks. It is a set of extensions to DNS, which provide to DNS users origin authentication of DNS data, authenticated denial of existence, and data integrity. All answers in DNSSEC are digitally signed. By checking the digital signature, a DNS user is able to check if the information is identical (correct and complete) to the information published at the authoritative DNS server.

DNSSEC was standardized in 2005 and uses a straightforward hierarchical verification architecture to learn keys and verify data. DNSSEC has become one component of naming and resolution services provided by DNS registry services.

By way of a simplified example of a top-level domain (TLD) implementing DNSSEC, the DNS records in the TLD zone file are digitally signed using a private key. The corresponding public key is published as a DNSKEY record in the TLD zone file, and is given to the root name server's provisioning system, which digitally signs a DNS record containing the fingerprint of the public key (a Delegation Signer ("DS") record) with the root zone's private key. The root zone's public key may be retrieved directly by a relying party from a local trust list by a client application. A lookup request queries the trusted root zone for authoritative name server information for the TLD and for the associated public key fingerprint. The public key fingerprint is then used to verify the TLD's public key. This process keeps the chain of trust intact. Because a lookup request begins with a trusted node (the root server), each subsequent step in the chain of lookups maintains the trust by using the public/key private key infrastructure. Thus, once the TLD's public key is verified using the public key fingerprint from its "parent", the root zone, the TLD name server returns the public key fingerprint for the next authoritative name server, which is digitally signed with the TLD's private key. The next authoritative name server has also digitally signed its DNS records with a private key. The chain continues indefinitely until the last node is reached and the ultimate DNS record, e.g., a record containing a web server's IP address, is determined. (Note that in practice, the DNSSEC trust chain typically is slightly more complex, with two levels of keys per zone. A key-signing key signs DNSKEY records, and a zone-signing key signs other records, including the DS record containing the fingerprint of the next zone's key-signing key.) Typically, DNSSEC validation and signing are handled sequentially, which can be a slow process. Thus, there is a need for a mechanism to validate and sign DNSSEC records more efficiently.

SUMMARY

According to examples of the present disclosure, a parallelized method for authenticating a DNS query using DNSSEC is provided. The method comprises obtaining, from a validating DNSSEC-aware DNS client, a DNS query for a resource record for a fully qualified domain name (FQDN); segmenting the FQDN into more than one specific sub-FQDN; providing, in parallel, a DNS query for a DNSSEC-related resource record for each of the more than one specific sub-FQDN to a respective authoritative name server or recursive resolver; obtaining, in parallel, the DNSSEC-related resource record for each of the more than one specific sub-FQDN; validating, in parallel, the DNSSEC-related resource record for each of the more than one specific sub-FQDN; combining each of the DNSSEC-related resource record for each of the more than one specific sub-FQDN; and verifying a chain-of-trust of the DNSSEC-related resource records.

According to examples of the present disclosure, a validating DNSSEC-aware DNS client is provided. The validating DNSSEC-aware DNS client comprises one or more processors; and a memory system comprising one or more non-transitory computer-readable media storing instructions that, when executed by at least one of the one or more processors, cause the validating DNSSEC-aware DNS client to perform a parallelized method for authenticating a DNS query using DNSSEC, the method comprising: obtaining, at a validating DNSSEC-aware DNS client, a DNS query for a resource record for a fully qualified domain name (FQDN); segmenting the FQDN into more than one specific sub-FQDN; providing, in parallel, a DNS query for a DNSSEC-related resource record for each of the more than one specific sub-FQDN to a respective authoritative name server or recursive resolver; obtaining, in parallel, the DNSSEC-related resource record for each of the more than one specific sub-FQDN; validating, in parallel, the DNSSEC-related resource record for each of the more than one specific sub-FQDN; combining each of the DNSSEC-related resource record for each of the more than one specific sub-FQDN; and verifying a chain-of-trust of the DNSSEC-related resource records.

In accordance with examples of the present disclose, a non-transitory computer readable storage medium comprising instructions for causing one or more processors to perform a parallelized method for authenticating a DNS query using DNSSEC is provided. The method comprises obtaining, at a validating DNSSEC-aware DNS client, a DNS query for a resource record for a fully qualified domain name (FQDN); segmenting the FQDN into more than one specific sub-FQDN; providing, in parallel, a DNS query for a DNSSEC-related resource record for each of the more than one specific sub-FQDN to a respective authoritative name server or recursive resolver; obtaining, in parallel, the DNSSEC-related resource record for each of the more than one specific sub-FQDN; validating, in parallel, the DNSSEC-related resource record for each of the more than one specific sub-FQDN; combining each of the DNSSEC-related resource record for each of the more than one specific sub-FQDN; and verifying a chain-of-trust of the DNSSEC-related resource records.

In some examples, the validating DNSSEC-aware DNS client is a stub resolver or a recursive resolver.

In some examples, the more than one specific sub-FQDN comprises a second-level domain, a top-level domain, and a root.

In some examples, the DNSSEC-related resource record comprises RRset that comprises a public key portion of a zone signing key (ZSK) and a public key portion of a key signing key (KSK), a RRSIG record for the DNSKEY RRset, and a delegation signer (DS) record that comprises a hash of the DNSKEY record and corresponding RRSIG.

In some examples, the validating further comprises verifying the RRSIG record of the RRset for the resource record with the public key portion of the ZSK and verifying the RRSIG record of the DNSKEY RRset with the public key portion of the KSK.

In some examples, the validating comprises a piped verification of the DS records by the mean of the public key portion of the KSK to rebuild the chain of trust.

In some examples, the method can further comprise caching the DNSKEY RRset and corresponding RRSIG records, as well as the DS record into a separate and specific lookup cache of the DNSSEC-aware DNS client.

In some examples, the more than one specific sub-FQDN comprises a sequence of non-partial sub-FQDNs obtained from left to right to a root zone. For example for the FQDN http://test.example.com, the more than one specific sub-FQDN moving for left to right towards the root include test.example.com, example.com, "com," and "." (the root).

According to examples of the present disclosure, a DNSSEC-aware DNS client is provided that comprises an application programming interface (API) configured to obtain a DNS query for a resource record for a fully qualified domain name (FQDN); a fetch engine logic configured to segment the FQDN into more than one specific sub-FQDN; a connection logic configured to provide, in parallel, a DNS query for a DNSSEC-related resource record for each of the more than one specific sub-FQDN to a respective authoritative name server or recursive resolver and configured to obtain, in parallel, the DNSSEC-related resource record for each of the more than one specific sub-FQDN; a validation logic configured to validate, in parallel, the DNSSEC-related resource record for each of the more than one specific sub-FQDN, combine each of the DNSSEC-related resource record for each of the more than one specific sub-FQDN, verify a chain-of-trust of the DNSSEC-related resource records, and provide an answer to the DNS query to the API after the chain-of-trust is verified.

In some examples, the DNSSEC-aware DNS client is a stub resolver or a recursive resolver.

In some examples, the validation logic is configured to verify the RRSIG record of the RRset for the resource record with the public key portion of the ZSK and verify the RRSIG record of the DNSKEY RRset with the public key portion of the KSK.

In some examples, the validation logic is configured to perform a piped verification of the DS records by the mean of the public key portion of the KSK to rebuild the chain of trust.

In some examples, the DNSSEC-aware DNS client further comprising a cache to store the DNSKEY RRset and corresponding RRSIG records, as well as the DS record into a separate and specific lookup cache of the DNSSEC-aware DNS client.

It is to be understood that both the foregoing general description and the following detailed description are exemplary and explanatory only and are not restrictive of the implementations, as claimed.

BRIEF DESCRIPTION OF THE DRAWINGS

FIG. 6 shows differentiated caching of DNS and DNSSEC-related records, according to examples of the present disclosure.

FIG. 7 shows a validation flow for 'example.com,' according to examples of the present disclosure.

DETAILED DESCRIPTION

Figure 1:
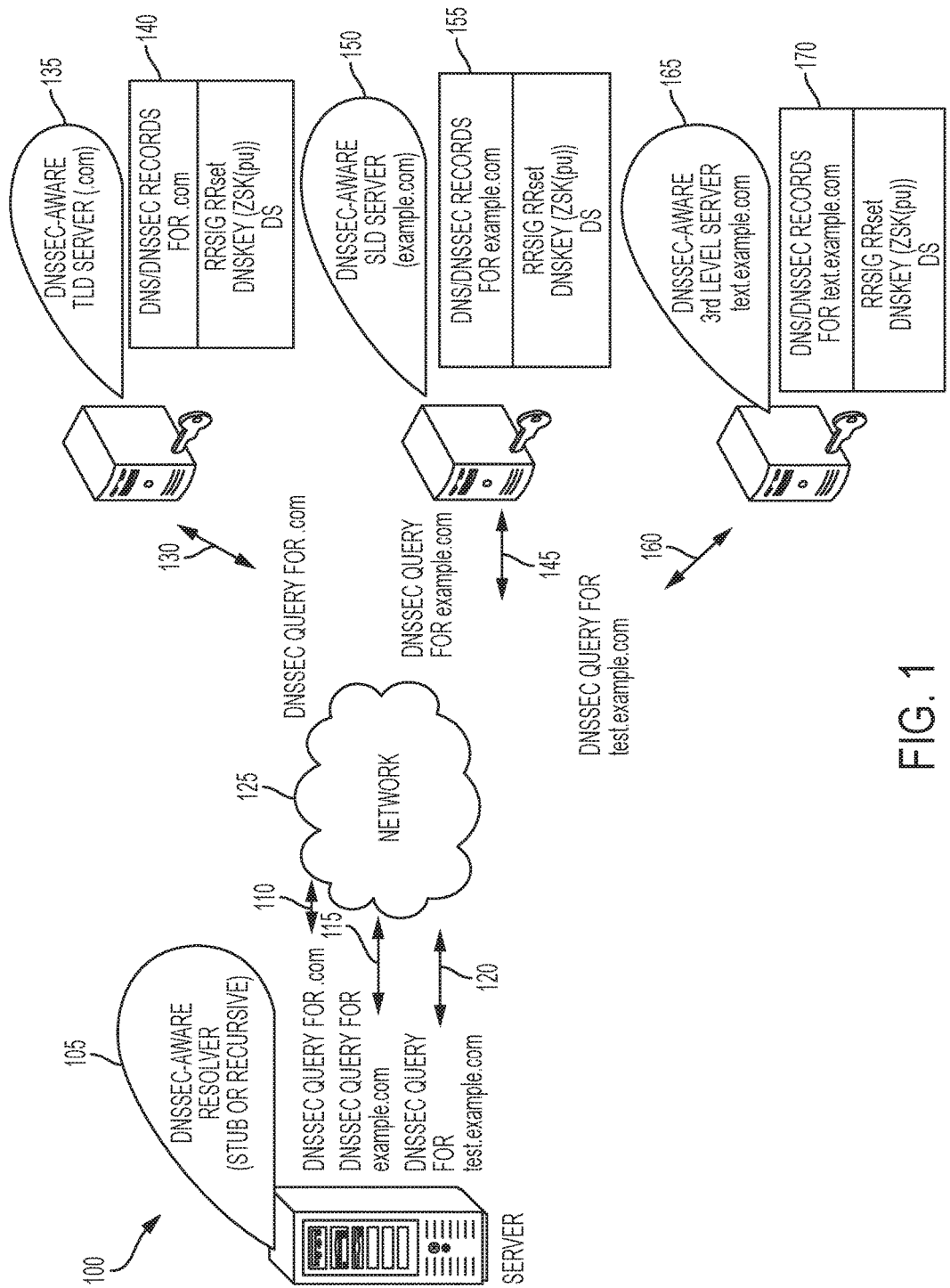
FIG. 1 shows a system, according to examples of the present disclosure.

Reference will now be made in detail to example implementations, which are illustrated in the accompanying drawings. When appropriate, the same reference numbers are used throughout the drawings to refer to the same or like parts.

For simplicity and illustrative purposes, the principles of the present disclosure are described by referring mainly to exemplary implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary implementations. Electrical, mechanical, logical and structural changes may be made to the exemplary implementations without departing from the spirit and scope of the present disclosure. The following detailed description is, therefore, not to be taken in a limiting sense and the scope of the present disclosure is defined by the appended claims and their equivalents.

DNSSEC is a set of security extensions to DNS that provides a way for authenticating DNS records. DNSSEC is defined by the Internet Engineering Task Force (IETF) in RFCs 4033, 4034, and 4035. Each answer from a DNSSEC protected zone is digitally signed. DNSSEC provides a way for DNS records to be trusted by whoever receives them. DNSSEC uses public key cryptography to ensure that DNS records are authentic. DNSSEC not only allows a DNS server to prove the authenticity of the records it returns, it also allows the assertion of "non-existence of records". The DNSSEC trust chain is a sequence of records that identify either a public key or a signature of a set of resource records. The root of this chain of trust is the root key which is maintained and managed by the operators of the DNS root.

Several record types are defined by DNSSEC including DNSKEY, DS, and resource record signature (RRSIG). The DNSKEY record type is a public key used to sign a set of resource records (RRset). The DS record type is a delegation signer (a hash of a key). The RRSIG record type is a signature of a RRset that shares name/type/class. The DNSKEY can be classified into two roles, which can be handled by separate keys or a single key. For example, a key signing key (KSK) can be used to sign DNSKEY records. A zone signing key (ZSK) can be used to sign all other records in the domain in which it is authoritative for. The KSK and the ZSK are a public/private key pair, where the private component is used to sign the various DNSSEC-related records and is kept secret. In the context of this application, the public component (pu) of the KSK and/or ZSK is to be considered, unless the private component is expressly mentioned.

The set of all records of a given type for a domain name is called an RRset. An RRSIG is essentially a digital signature for an RRset. Each RRSIG is associated with a DNSKEY. The RRset of DNSKEYs are signed with the key signing key (KSK). All others are signed with the zone signing key (ZSK). Trust is conferred from the DNSKEY to the record through the RRSIG: if you trust a DNSKEY, then you can trust the records that are correctly signed by that key.

However, the domain's KSK is signed by itself, making it difficult to trust. The way around this is to walk the domain up to the next/parent zone. To verify that the DNSKEY for example.com is valid, you have to ask the .com authoritative server. This is where the DS record comes into play: it acts as a bridge of trust to the parent level of the DNS.

The DS record is a hash of a DNSKEY. The .com zone stores this record for each zone that has supplied DNSSEC keying information. The DS record is part of an RRset in the zone for .com and therefore has an associated RRSIG. This time, the RRset is signed by the .com ZSK. The .com DNSKEY RRset is signed by the .com KSK.

The ultimate root of trust is the KSK DNSKEY for the DNS root. This key is universally known and published. By following the chain of DNS KEY, DS and RRSIG records to the root, any record can be trusted.

Generally speaking, examples of the present disclosure provide a fast and parallelized method authenticating, e.g., validating, a DNS query using DNSSEC by (1) fetching Resource Record in parallel with the needed DNSSEC counterparts (i.e. DNSKEY, DS and RRSIG RRSet); (2) validating the RRSIG signatures in the same fetching thread; (3) propagating the needed DNSKEY records to a companion thread validating the RRSIG signature of the DS; and (4) piping all these partial results to rebuild the chain of trust (verifying the trusted link between signed parent and child zones). In some examples the parallelized method can be used to sign DNSSEC-related records.

For example, since DNS is a tree data structure, meaning that for the example domain 'test.example.com,' 'com' is the parent of 'test.example,' and 'example.com' is the parent of 'test', and so of for all the valid combinations which in the specific case of this validation are 'test.example.com,' 'example.com,' 'com,' and '.' (root)—, which are the queries to be performed. Meaning, the '.' root (parent) is used to validate the child 'com,' and recursively, 'com,' is used to validate the child 'example,' and recursively, 'example' is used to validate 'test,' all intended as DNS zones—these are the relationships according to the hierarchical organization of the DNS.

The present disclosure provides for parallel fetching, parallel/concurrent signature validation/verification, and piped chain of trust verification. The records that are used in the present method includes DNSKEY—ZSK+KSK, DS, and RRSIG, where the DS record has a RRSIG, and points to the KSK, where the KSK signs the ZSK, and generates a RRSIG, and where ZSK signs any record in the Zone (e.g. TXT, A, SRV, etc.) and produces as many respective RRSIG.

FIG. 1 illustrates a system 100 according to examples of the present disclosure. The DNSSEC-aware resolver 105 is a device that queries DNS and may be a desktop computer, a laptop computer, a smartphone, or other device that makes DNS queries. The DNSSEC-aware resolver 105 may also be a recursive name server. The DNSSEC-aware resolver 105 may include programs that access the Internet such as a web browser or email application. For example, a user may input a domain name into the address bar of their browser (e.g., http://test.example.com) to access that page, which causes the browser to make a request for the IP address mapped to that domain name.

The DNSSEC-aware resolver 105 makes a DNS query for a DNS resource record ("RR") A-type, e.g., the IP address, for www.test.example.com to DNSSEC-aware servers 135, 150, and 165 over a network 125. The DNSSEC-aware resolver 105 separates the query for TEST.EXAMPLE.COM into sub-queries for TEST.EXAMPLE.COM 120, EXAMPLE.COM 115, and COM 110. The root "." is normally internally stored in the DNSSEC-aware resolver 105 for security reasons. The sub-query for COM is provided to a DNSSEC-aware TLD server 135 for related DNS/DNSSEC records 140, the sub-query for EXAMPLE.COM is provided to a DNSSEC-aware SLD server 155 for related DNS/DNSSEC records 155, and the sub-query for TEST.EXAMPLE.COM is provided to a DNSSEC-aware $3^{rd}$ level server 165 for related DNS/DNSSEC records 170.

Figure 2:
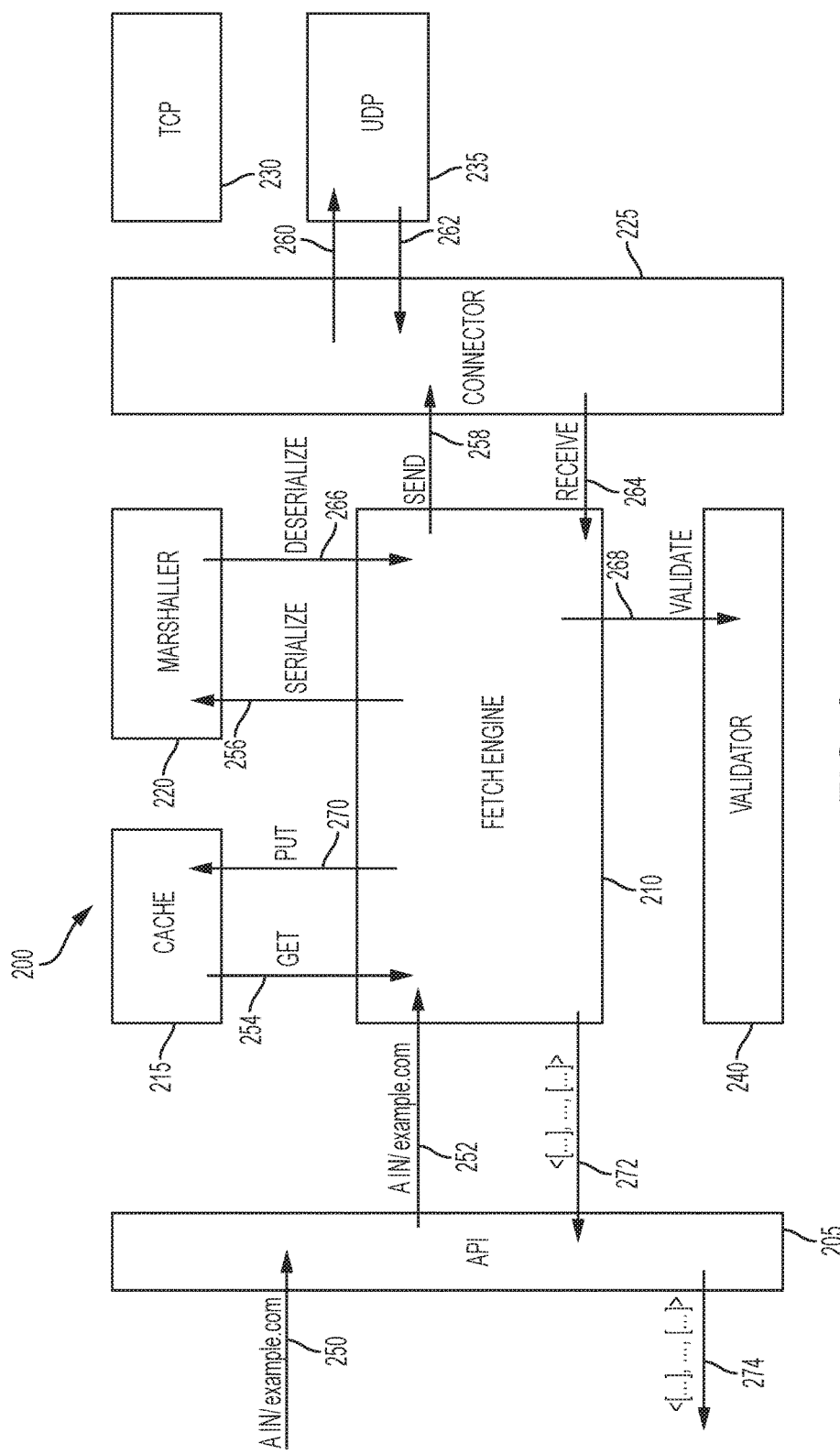
FIG. 2 shows components and processing for the fast and parallelized method 200 for authenticating a DNS query using DNSSEC by the DNSSEC-aware DNS resolver 105, according examples of the present disclosure.

FIG. 2 shows components and processing for the fast and parallelized method 200 for authenticating a DNS query using DNSSEC by the DNSSEC-aware DNS resolver 105, according examples of the present disclosure. In the example where the DNSSEC-aware DNS resolver 105 is a client device like a desktop, laptop, table, or smart phone, the components of FIG. 2 can communicate with a stub resolver (not shown). An API 205 receives a DNS query 250 from a user. For example, the user types into a navigation bar of a web browser the domain name "test.example.com" to locate the internet address for a server hosting the domain name "test.example.com," denoted by "IN/test.example.com." A fetch engine 210 is configured to obtain the DNS query 250 from the API 205, analyze the DNS query 250, and separates the DNS query 250 down into sub-FQDNs, i.e., "test.example.com," "example.com," ".com," and the root ("."). The fetch engine 210 then performs in parallel one-by-one all the needed DNS queries and performs the validation of the chain of trust in pipe in parallel. Cache 215 maintains previously seen DNS queries, response, and validations. The fetch engine 210 queries the cache 215 to locate the relevant DNSSEC data, i.e., the DNSKEY RRset and corresponding RRSIG records, as well as the DS record. If the cache 215 has the relevant records stored therein, the cache 215 returns those records to the fetch engine 210 in a GET operation 254. If the cache 215 does not have the relevant records, the fetch engine 210 provides the separated DNS queries to a marshaller 220, where the marshaller 220 is configured to "marshal" an object representative of the separated DNS queries by recording their state and codebase(s) in such a way that when the marshalled object is "unmarshalled," a copy of the original object is obtained, possibly by automatically loading the class definitions of the object. The marshaller 220 can serialize 256 the objects representative of the separated DNS queries to convert their state into a byte stream in such a way that the byte stream can be converted back into a copy of the object. The fetch engine 210 provides the serialized data 258 to a connector 225 that is able to condition data for transmission over different topologies of network transport, including TCP 230 and UDP 235. For example, if the data is transported over TCP, the connector 225 can format the data as a TCP packet and handle the various protocols operations between the DNSSEC-aware client and the DNSSEC-aware recursive server(s) and/or the authoritative name server(s). If the data is transported over UDP, the connector 225 can format the data as a UDP packet.

The connector 225 obtains, at 262, the DNSSEC-related resource records from the DNSSEC-aware recursive server(s) and/or the authoritative name server(s) over TCP 230 or UDP 235. Although FIG. 2 shows the connector 225 communicating with the UDP 235, the connector 225 communicates with both TCP 230 and UDP 235. The fetch engine 210 obtains, at 264, the DNSSEC-related resource records from the connector 225. The fetch engine 210, at 266, obtains the unmarshalled and deserialized object from marshaller 220. The fetch engine 2210, at 268, provides unmarshalled and deserialized object to a validator 240 that performs the cryptographic operations for the validation of the DNSSEC-related resource records. The fetch engine 210, at 270, provides the DNSSEC-related resource records to the cache 215 via a PUT operation if those records are not already stored. The fetch engine 210, at 272, provides the output of the validator 240 to the API 205, which is then returned to the user at 274.

Figure 3:
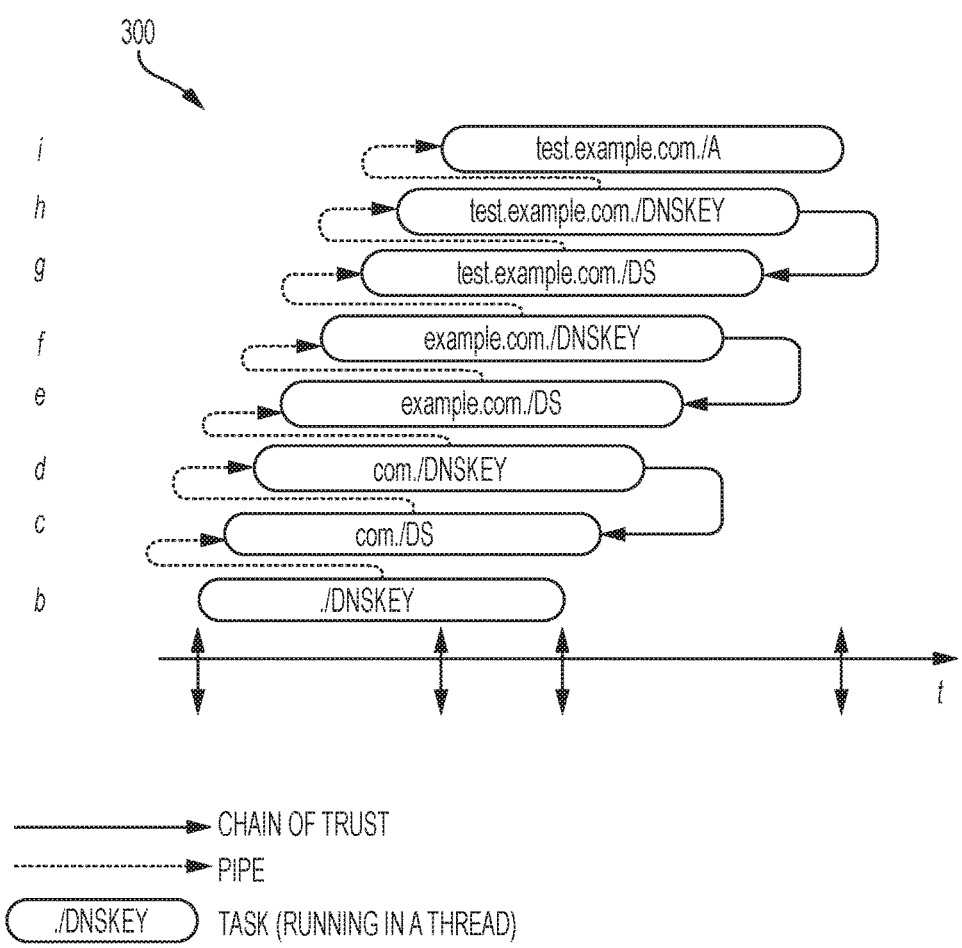
FIG. 3 shows the validation process 300 performed by validator 240 based on DNSSEC-related records obtained by the fetch engine 210, according to examples of the present disclosure.

FIG. 3 shows the validation process 300 performed by validator 240 based on DNSSEC-related records obtained by the fetch engine 210, according to examples of the present disclosure. The fetching operations occur by a parallel input-output (IO)-bound fetching operation, where queries are performed in parallel. The validation operations occur in a piped validation operation, where concurrent CPU-bound operations are executed as early as possible in the validation process, taking benefit of the concurrent execution plan. Using the DNS query "test.example.com," from above, the DNS-aware client, i.e., stub resolver or recursive resolver, request the IP address, e.g., the A record, for test.example.com. As discussed above, the DNS query is separated into sub-FQDNs and the DNSSEC-related resource records are requested from the recursive name server(s) and/or the authoritative name server(s). For example, the sub-FQDNs are "test.example.com," "example.com," ".com," and the root ".". In this example, the order of the sub-FDQN are inversed and queries are created for each sub-FQDN. The queries are as follows:

a. '.' is normally trusted, and KSK is hardcoded (either in the sub-resolver or recursive resolver),
    b. '.' IN DNSKEY (i.e. retrieve the ZSK),
    c. 'com' IN DS' (i.e. retrieve the delegation signer record),
    d. 'com, IN DNSKEY' (i.e. retrieve the ZSK and KSK),
    e. 'example.com' IN DS (i.e. retrieve the delegation signer),
    f. 'example.com' IN DNSKEY (i.e. retrieve the ZSK and KSK),
    g. 'test.example.com' IN DS (i.e. retrieve the delegation signer),
    h. 'test.example.com' IN DNSKEY (i.e. retrieve the ZSK and KSK),
    i. 'test.example.com' IN A (i.e. retrieve the A record).

Technically, the query plan is executed in parallel, and individual processes (above items) exchanges via generic pipes (e.g. channels, queues, dependent on of the programming language). The validation process, which is executed in order: from above, b is executed first, c right after, and so on. There is no need in a real implementation to execute a, since the root doesn't have any DS since it's trusted by default (shown for illustrative purpose in FIG. 3A). The query plan execution is as follows:

i. In b, DNSKEY RRSet is verified (RRSIG verification) using the trusted and hardcoded KSK of '.',keys are propagated to c via a pipe;
    ii. In c, DS RRSet is verified (RRSIG verification) using the verified ZSK of '.', delegation signer is propagated to d via a pipe;
    iii. In d, DNSKEY RRSet is verified (RRSIG verification) using the KSK of 'com', upon the reception of the DS the KSK gets verified too (KSK hash verification), keys are propagated to e via a pipe;
    iv. In e, DS RRSet is verified (RRSIG verification) using the verified ZSK of 'com', delegation signer is propagated to f via a pipe;
    v. In f, DNSKEY RRSet is verified (RRSIG verification) using the KSK of 'example.com', upon the reception of the DS the KSK gets verified too (KSK hash verification), keys are propagated to g via a pipe;
    vi. In g, DS RRSet is verified (RRSIG verification) using the ZSK of 'example.com', delegation signer is propagated to h via a pipe;
    vii. In h, DNSKEY RRSet is verified (RRSIG verification) using the KSK of 'test.example.com', upon the reception of the DS the KSK gets verified too (KSK hash verification), keys are propagated to i via a pipe;
    viii. In i, the A RRSet is verified (RRSIG verification) using the ZSK of 'test.example.com'.

In the above example, 'pipe' refers to piped operations as a set of predefined operations which are executed into a processing pipeline. The piped operations has the following capabilities: the overall computation is split into multiple units of work that can be executed according to a predefined control flow (i.e. a after b, once c and d get processed in parallel); the nature is sequential but each branch of the pipe may contain concurrent/parallel operations. In this specific context, the piped operations include the DNSKEY validation that is piped to the DS and A validation and the chain of trust validation, which includes backtracking the hash of the ZSK contained into the actual DS for the specific DNS Zone.

Figure 4:
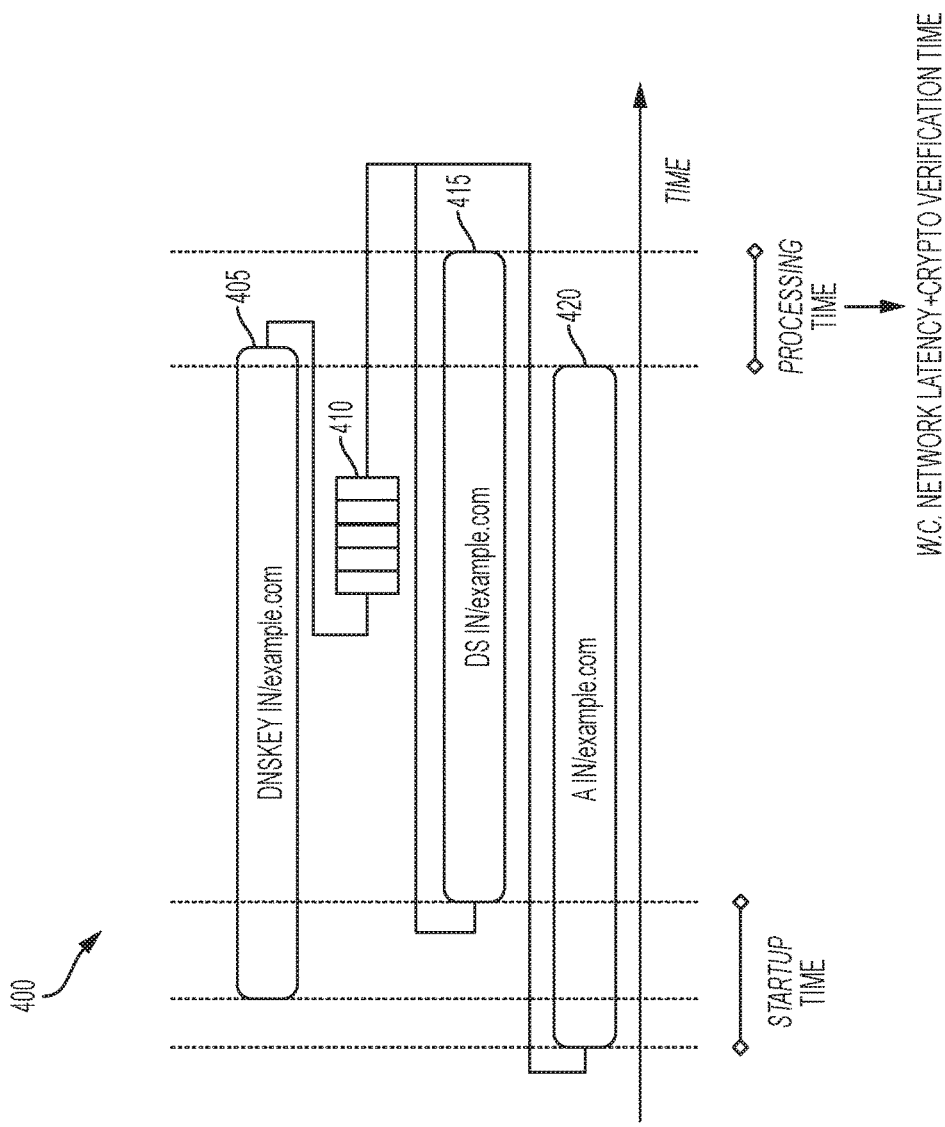
FIG. 4 shows a time line showing a startup time and processing time for inter-thread communication for the fetching and/or validating process 400, according to examples of the present disclosure.
Figure 5:
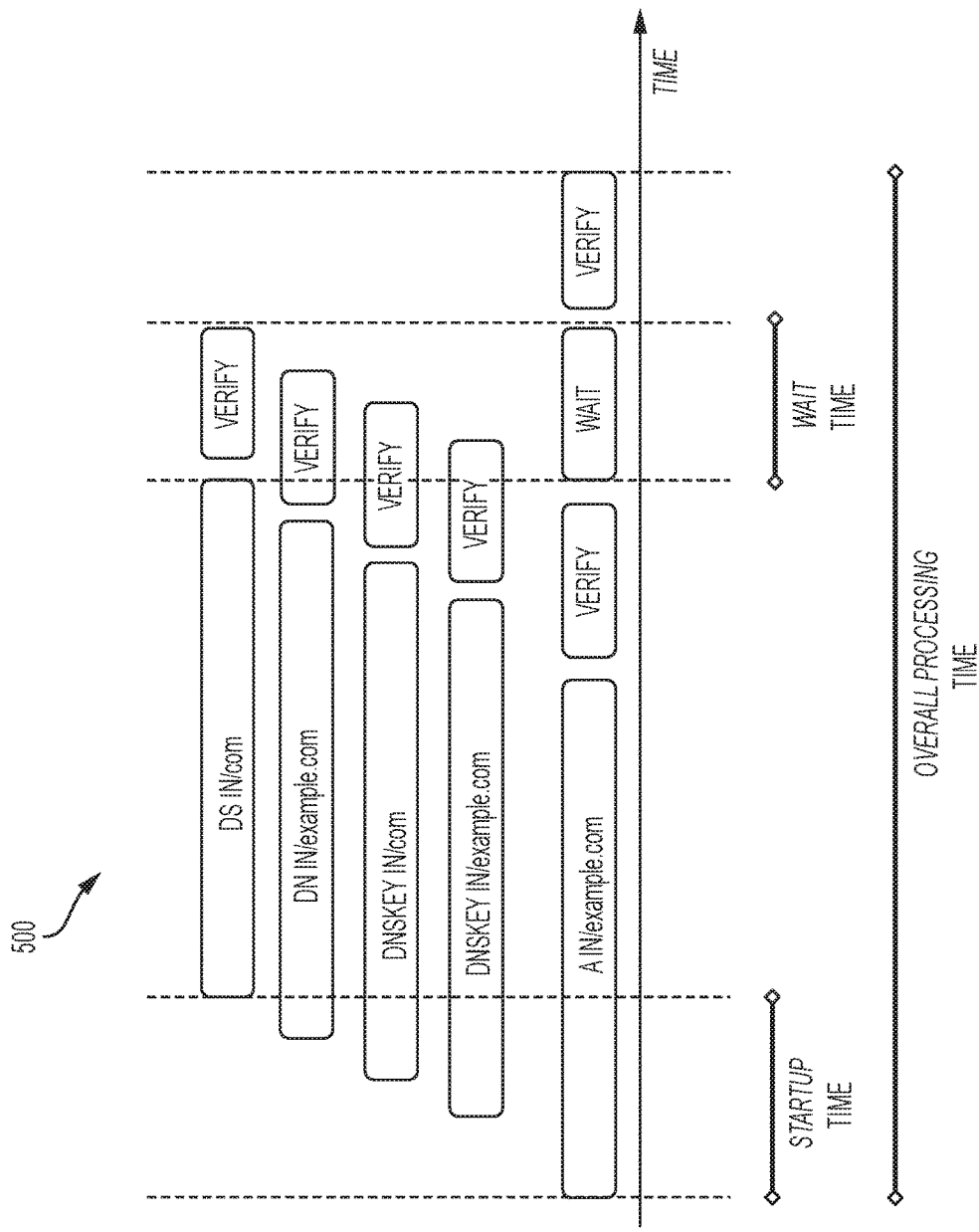
FIG. 5 shows a time line showing the parallel fetching process 500 performed by fetch engine 210, according to examples of the present disclosure.

Considering the validation example of TEST.EXAMPLE.COM, seven queries are performed because the root is normally pre-configured (for obvious security reasons, topmost anchor of trust): COM DS+DNSKEY, EXAMPLE.COM DS+DNSKEY, and TEST.EXAMPLE.COM DS+DNSKEY+A, and ZSK of the root is pre-configured. Assuming for a moment that the validation for each individual step is accomplished, as further described below, the results of these validations are trusted and joined to validate the chain of trust from the leaf (TEST.EXAMPLE.COM) to the root ('.', pre-configured). For a multithreaded system as shown in FIGS. 4 and 5, a barrier can be put for all the thread synchronization with the aim to: validate COM's DS record with '.''s KSK (trusted by definition), EXAMPLE.COM's DS record with COM's KSK (validated before of the barrier), TEST.EXAMPLE.COM with EXAMPLE.COM's KSK (validated before of the barrier). The barrier, as known in parallel computing, is a type of synchronization for a group of threads or processes in the source code where thread/process must stop at this point and cannot proceed until all other threads/processes reach this barrier.

For the validation, a Resource Record is signed by the ZSK, the signature produces a Record named RRSIG (Resource Record SIGnature); a KSK signs the ZSK and produces a RRSIG; a DS (Delegation Signer, in the parent zone) links the KSK (of the child zone) via a cryptographic hash. This mechanism ensures trust: COM is managed by registry, i.e., Verisign, EXAMPLE. COM is managed by the owner of this domain, so the KSK of EXAMPLE.COM is linked by the DS that is provided to Verisign; and so on, up to the root which is operated by Verisign but managed by ICANN.

The validation process is the inverse of the signature process: the RRSIG for a Resource Record is validated using the ZSK; the ZSK is validated using the KSK; the KSK is validated using the DS. In order to validate the entire chain of trust, if 'TEST.EXAMPLE.COM A IN' is queried (meaning, return the Internet Address of TEST.EXAMPLE.COM), the DS record validation should be: TEST.EXAMPLE.COM KSK with DS in EXAMPLE.COM, EXAMPLE.COM KSK with DS in COM, and COM KSK with DS in '.' All the DS records are validated themselves with the signing key of the hosting zone. This last process (sequential validation up to the root, or reversing from the root) occurs in pipe as soon as the single zone validations are complete.

In case of unsatisfied verification(s), the above said query plan can be either aborted immediately, or at the very end: in the latter case, the response time will be a bit higher but if more failures happen a more detailed view is provided. The above said query plan is executed in parallel for the IO-bound operations (i.e. network calls) and concurrency for the CPU-bound operations (i.e. crypto verification); the overall processing pipeline does not evolve necessarily as described above (operations are concurrent), but it is implemented as said (propagations and wait barriers). At the end of each of the above validation steps, records and validation results are stored in the DNSSEC specific cache.

FIG. 4 shows a time line showing a startup time and processing time for inter-thread communication for the fetching and/or validating process 400, according to examples of the present disclosure. The inter-thread communication provides for queue-based propagation and allows for concurrent operations that provides reduced computing latency and absorbs CPU-bound tasks in IO-bound ones. Once a first thread 405 validates the DNSKEY, the validated DNSKEY can be provided to a second thread 415 that validates the DS record and a third threat that validates the A record. If the second thread 415 and/or the third thread 420 is not ready to accept the results from the first thread 405, the validated DNSKEY can be put into queue 410.

FIG. 5 shows a time line showing the parallel fetching process 500 performed by fetch engine 210, according to examples of the present disclosure. The fetch engine 210 can initiate multiple threads to carry out the parallel fetching process 500, which using a queue-based propagation that enables pipelined DNSSEC verification and reduced "turn-around wait" time. The parallel fetching shows the fetching for 'com' IN DS' (i.e. retrieve the delegation signer record), 'example.com' IN DS (i.e. retrieve the delegation signer), 'com, IN DNSKEY' (i.e. retrieve the ZSK and KSK), 'example.com' IN DNSKEY (i.e. retrieve the ZSK and KSK), and 'example.com' IN A (i.e. retrieve the A record).

FIG. 6 shows differentiated caching of DNS and DNSSEC-related records, according to examples of the present disclosure. The differentiated caching can be used by the cache 215. For example, the cache 215 includes a first sub-cache 610 for canonical records, i.e., A records, etc., and a second sub-cache 615 for DNSSEC-related records, i.e., DNSKEY, DS, etc.

FIG. 7 shows a validation flow for 'example.com,' according to examples of the present disclosure. As shown, the KSK for the root '.' is used to validate the ZSK for the root '.'. The ZSK and KSK for the root '.' is used to validate the DS record for '.com.' The KSK for '.com' is used to validate the ZSK for '.com.' The ZSK and KSK for '.com' is used to validate the DS record for 'example.com'. The KSK for 'example.com' is used to validate the ZSK for 'example.com'.

Figure 8:
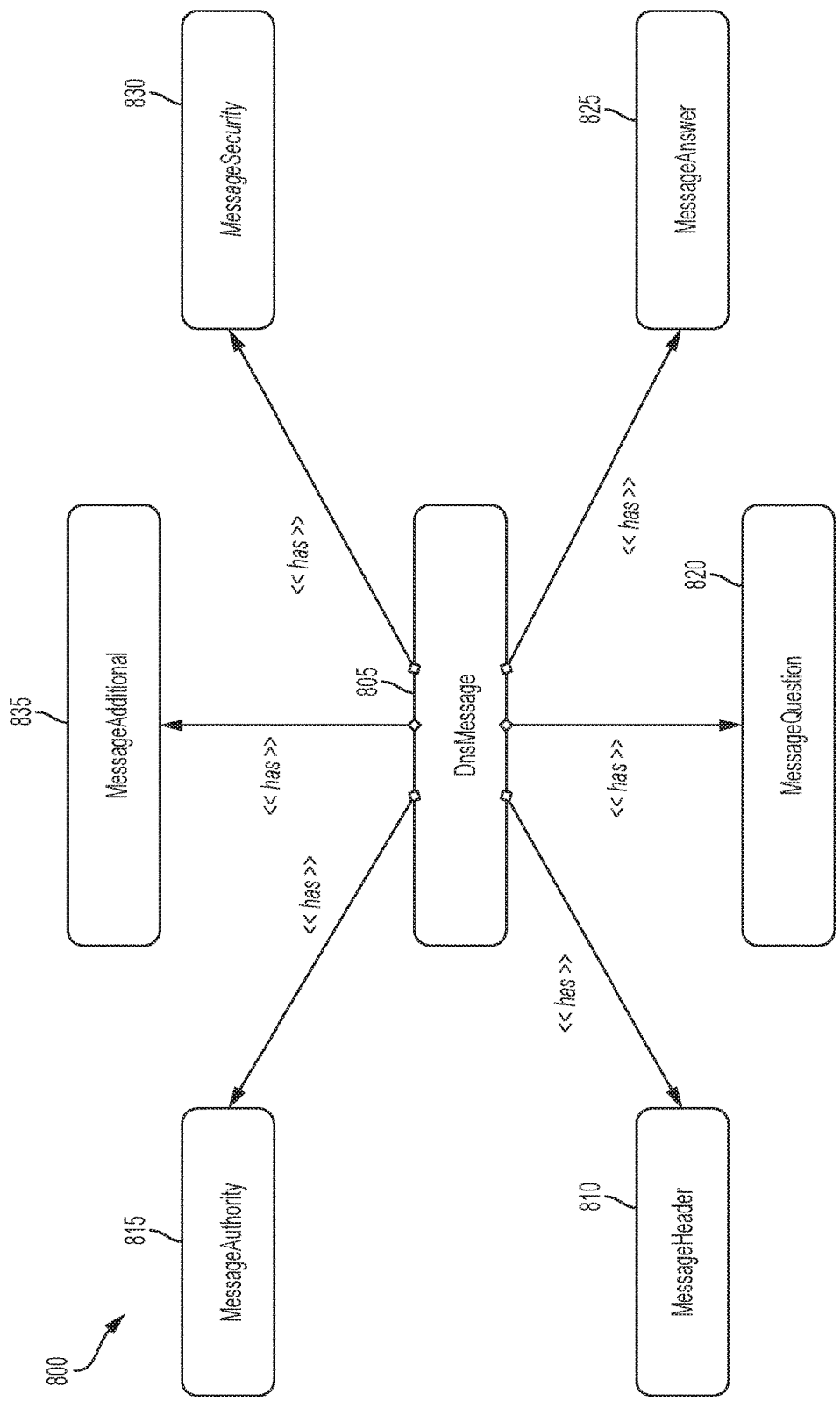
FIG. 8 shows a basic data unit of the designed Resolver is the DnsMessage 800, according to examples of the present disclosure.

FIG. 8 shows a basic data unit of the designed Resolver is the DnsMessage 800, according to examples of the present disclosure. A DnsMessage 805 is composed by: MessageHeader 810, MessageAuthority 815, MessageQuestion 820, MessageAnswer 825, MessageSecurity 830, and MessageAdditional. This is an OO (Object Oriented) design which respect the RFC1035 DNS frame design, apart of the MessageSecurity which is an ad-hoc extension which includes the detailed results from the DNSSEC validation process. The DnsMessage is maintained in cache, such as cache 215, 600 for the entire time-to-live (TTL) time.

Figure 9:
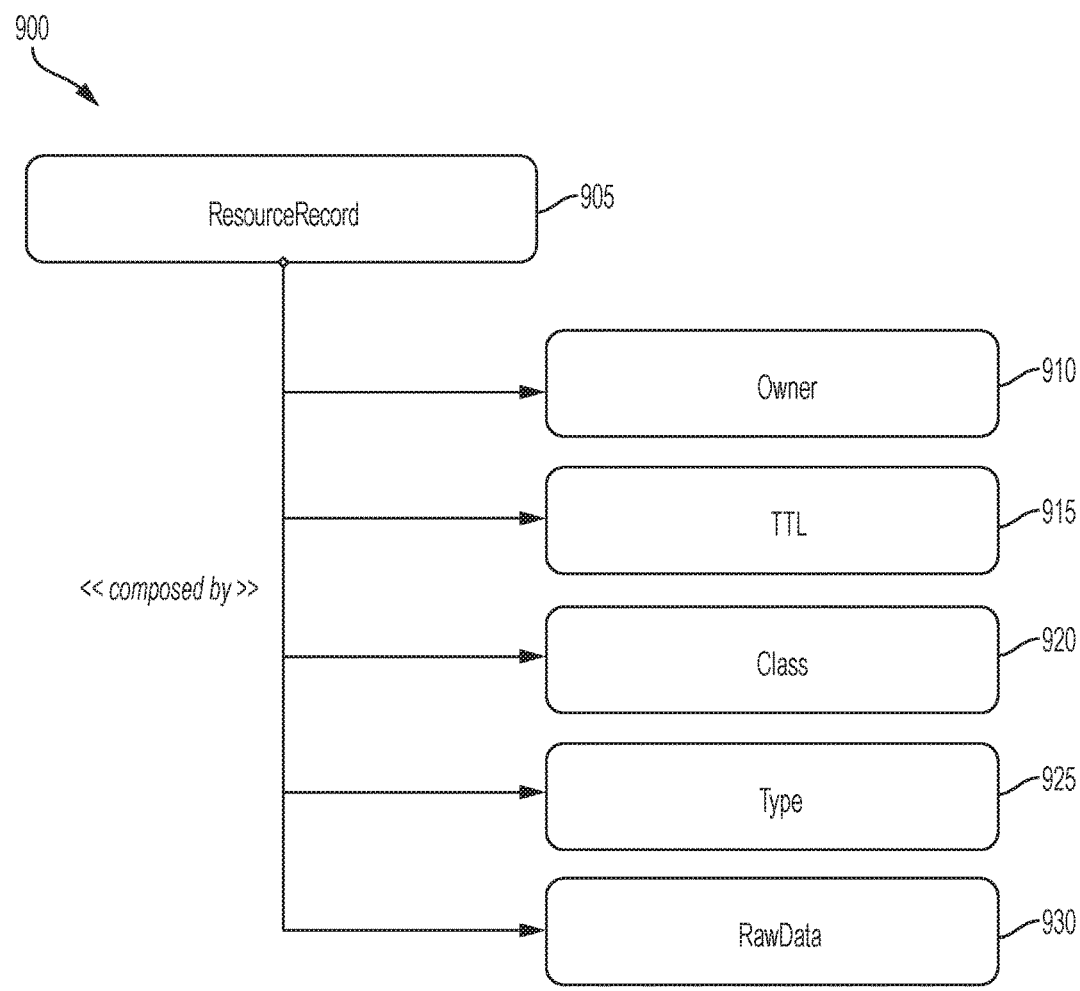
FIG. 9 shows one or more ResourceRecord(s) contained in a DnsMessage 900, according to examples of the present disclosure.

FIG. 9 shows one or more ResourceRecord(s) contained in a DnsMessage 900, according to examples of the present disclosure. According to RFC1035, a DNS Resource Record 905 is composed by Owner 910, TTL 915, Class 920, Type 925, and Raw Data 930, from this the direct translation to an OO design which has the notion of composition by in the mode. The relationship between DnsMessage and ResourceRecord is one to many.

Figure 10:
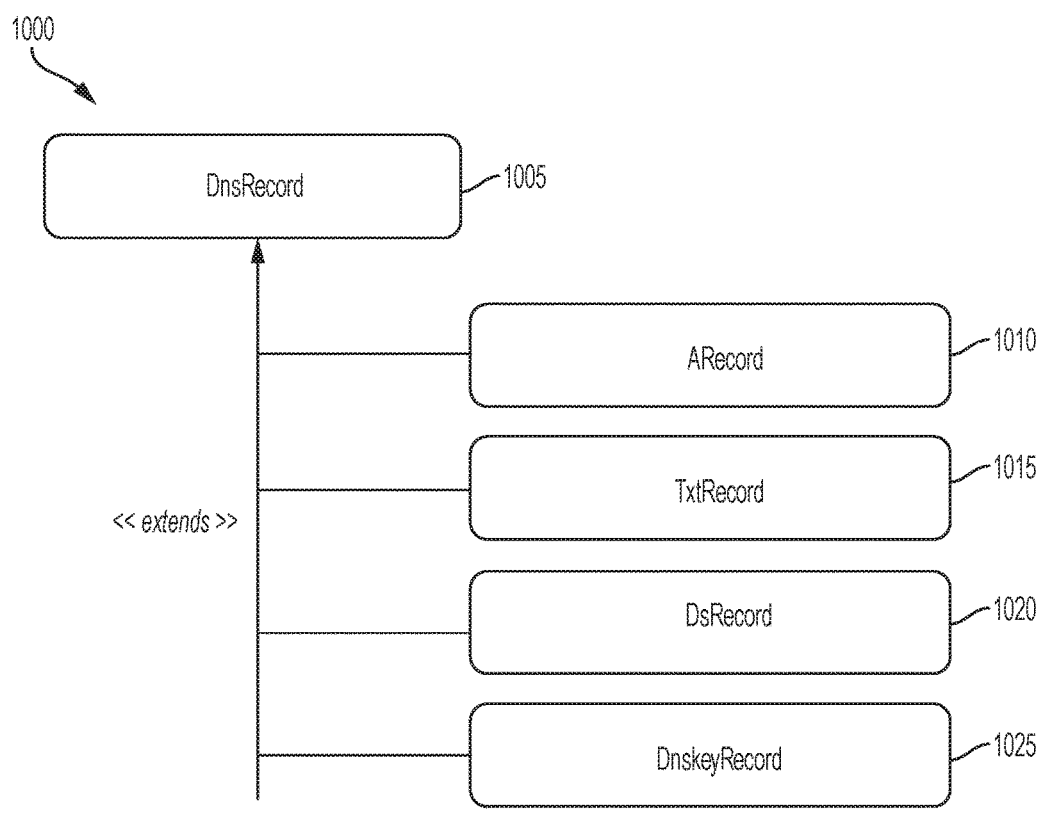
FIG. 10 shows DnsRecord 1000, according to examples of the present disclosure.

FIG. 10 shows DnsRecord 1000, according to examples of the present disclosure. The DnsRecord 1000 includes additional records, including but are not limited to, Arecord 1010, TxtRecord 1015, DsRecord 1020, DnskeyRecord 1025, SOA, etc. Each record has a set of common properties which are owned by the superclass DnsRecord 1005 and inherited by the child classes ARecord 1010, TxtRecord 1015, and so on. In particular, child classes are able to parse the Raw Data (byte array) into a processable format: e.g. a TXT may have many key/value couple as content in the Raw Data, the TxtRecord 1015 is able to parse the DnsRecord RawData attribute into a specific Dictionary of key/value parsed by the byte array.

Figure 11:
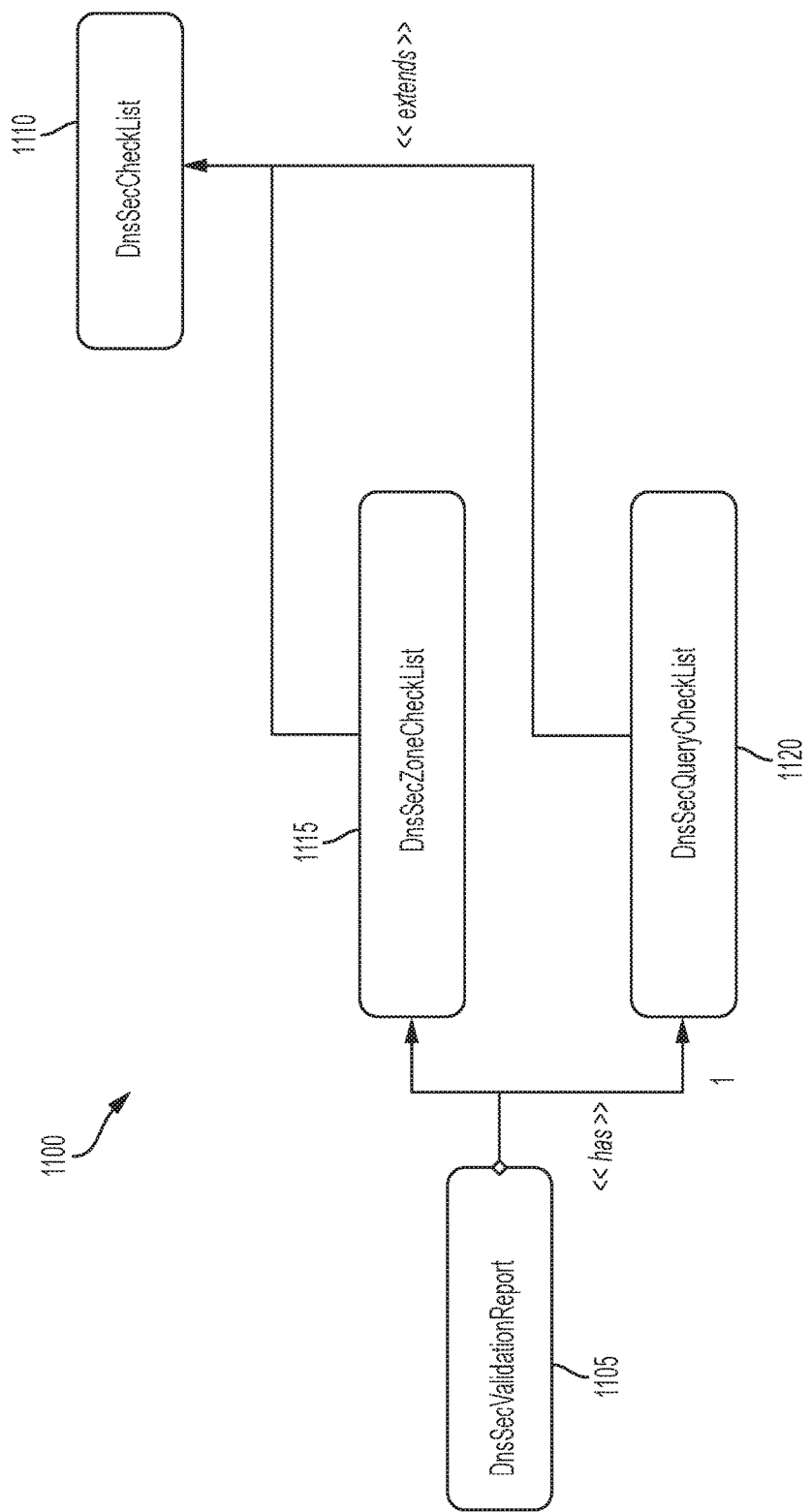
FIG. 11 shows a data model 1100 for a DnsSecValidationReport 1105 that is a specific Data type to maintain the DNSSEC validation information, according to examples of the present disclosure.

FIG. 11 shows a data model 1100 for a DnsSecValidationReport 1105 that is a specific Data type to maintain the DNSSEC validation information, according to examples of the present disclosure. A DnsSecCheckList 1110 is the generic Data Type holding a dictionary of specific common attributes of a DNSSEC validation; DnsSecZoneCheckList 1115 and DnsSecQueryCheckList 1120 are specialization augmenting the dictionary with specific attributes of the Zone and Query validation: e.g. in case of an error in validating the ZSK with the KSK this detail will be reported into the DnsSecZoneCheckList 1115 with a set of ancillary information, like a specific reason (the dictionary will be filled up with the failed validation step).

Figure 12:
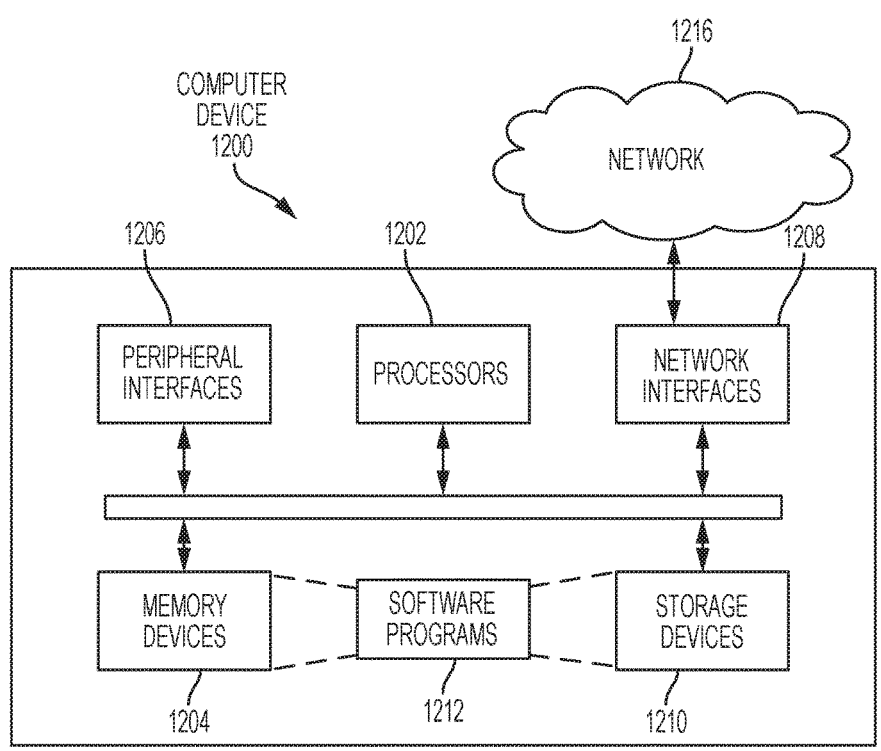
FIG. 12 is an example computer system for performing the disclosed implementations, consistent with the present disclosure.

FIG. 12 illustrates an example of a hardware configuration for a computer device 1200 that can be used as mobile device or server, which can be used to perform one or more of the processes described above. While FIG. 12 illustrates various components contained in the computer device 1200, FIG. 12 illustrates one example of a computer device and additional components can be added and existing components can be removed.

The computer device 1200 can be any type of computer devices, such as desktops, laptops, servers, DNS resolver, DNS client, DNS server, etc., or mobile devices, such as smart telephones, tablet computers, cellular telephones, personal digital assistants, etc. As illustrated in FIG. 12, the computer device 1200 can include one or more processors 1202 of varying core configurations and clock frequencies. The computer device 1200 can also include one or more memory devices 1204 that serve as a main memory during the operation of the computer device 1200. For example, during operation, a copy of the software that supports the DNS operations can be stored in the one or more memory devices 1204. The computer device 1200 can also include one or more peripheral interfaces 1206, such as keyboards, mice, touchpads, computer screens, touchscreens, etc., for enabling human interaction with and manipulation of the computer device 1200.

The computer device 1200 can also include one or more network interfaces 1208 for communicating via one or more networks, such as Ethernet adapters, wireless transceivers, or serial network components, for communicating over wired or wireless media using protocols. The computer device 1200 can also include one or more storage device 1210 of varying physical dimensions and storage capacities, such as flash drives, hard drives, random access memory, etc., for storing data, such as images, files, and program instructions for execution by the one or more processors 1202.

Additionally, the computer device 1200 can include one or more software programs 1212 that enable the functionality described above. The one or more software programs 1212 can include instructions that cause the one or more processors 1202 to perform the processes described herein. Copies of the one or more software programs 1212 can be stored in the one or more memory devices 1204 and/or on in the one or more storage devices 1210. Likewise, the data, for example, the DNS and/or DNSSEC-related data, utilized by one or more software programs 1212 can be stored in the one or more memory devices 1204 and/or on in the one or more storage devices 1210.

In implementations, the computer device 1200 can communicate with other devices via a network 1216. The other devices can be any types of devices as described above. The network 1216 can be any type of electronic network, such as a local area network, a wide-area network, a virtual private network, the Internet, an intranet, an extranet, a public switched telephone network, an infrared network, a wireless network, and any combination thereof. The network 1216 can support communications using any of a variety of commercially-available protocols, such as TCP/IP, UDP, OSI, FTP, UPnP, NFS, CIFS, AppleTalk, and the like. The network 1216 can be, for example, a local area network, a wide-area network, a virtual private network, the Internet, an intranet, an extranet, a public switched telephone network, an infrared network, a wireless network, and any combination thereof.

The computer device 1200 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 1200 as described above need not be enclosed within a single enclosure or even located in close proximity to one another. Those skilled in the art will appreciate that the above-described componentry are examples only, as the computer device 1200 can include any type of hardware componentry, including any necessary accompanying firmware or software, for performing the disclosed implementations. The computer device 1200 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

What is claimed is:

1. A parallelized method for authenticating a domain name system (DNS) query using domain name system security extensions (DNSSEC), the method comprising:
   obtaining, at a validating DNSSEC-aware DNS client, a DNS query for a resource record for a fully qualified domain name (FQDN);
   segmenting the FQDN into more than one specific sub-FQDN;
   providing, in parallel, a DNS query for a DNSSEC-related resource record for each of the more than one specific sub-FQDN to a respective authoritative name server or recursive resolver;
   obtaining, in parallel, the DNSSEC-related resource record for each of the more than one specific sub-FQDN;
   validating, in parallel, the DNSSEC-related resource record for each of the more than one specific sub-FQDN;
   combining each of the DNSSEC-related resource records for each of the more than one specific sub-FQDN; and
   verifying a chain of trust of the DNSSEC-related resource records.

2. The method of claim 1, wherein the validating DNSSEC-aware DNS client is a stub resolver or a recursive resolver.

3. The method of claim 1, wherein the more than one specific sub-FQDN comprises a second-level domain, a top-level domain, and a root.

4. The method of claim 2, wherein the DNSSEC-related resource record comprises a set of resource records (RRset) that comprises a public key portion of a zone signing key (ZSK) and a public key portion of a key signing key (KSK), a resource record signature (RRSIG) record for a DNSKEY RRset, and a delegation signer (DS) record that comprises a hash of a DNSKEY record and a corresponding RRSIG record.

5. The method of claim 4, wherein the validating further comprises verifying the RRSIG record for the DNSKEY RRset for the DNSSEC-related resource record with the public key portion of the ZSK and verifying the RRSIG record for the DNSKEY RRset with the public key portion of the KSK.

6. The method of claim 4, wherein the validating comprises a piped verification of the DS records by a mean of the public key portion of the KSK to rebuild the chain of trust.

7. The method of claim 5, further comprising caching the DNSKEY RRset and corresponding RRSIG records and the DS record into a separate and specific lookup cache of the DNSSEC-aware DNS client.

8. The method of claim 1, wherein the more than one specific sub-FQDN comprises a sequence of non-partial sub-FQDNs obtained from left to right to a root zone.

9. A validating domain name system security extensions (DNSSEC)-aware domain name system (DNS) client comprising:
   one or more processors; and
   a memory system comprising one or more non-transitory computer-readable media storing instructions that, when executed by at least one of the one or more processors, cause the validating DNSSEC-aware DNS client to perform a parallelized method for authenticating a DNS query using DNSSEC, the method comprising:

obtaining, at a validating DNSSEC-aware DNS client, a DNS query for a resource record for a fully qualified domain name (FQDN);

segmenting the FQDN into more than one specific sub-FQDN;

providing, in parallel, a DNS query for a DNSSEC-related resource record for each of the more than one specific sub-FQDN to a respective authoritative name server or recursive resolver;

obtaining, in parallel, the DNSSEC-related resource record for each of the more than one specific sub-FQDN;

validating, in parallel, the DNSSEC-related resource record for each of the more than one specific sub-FQDN;

combining each of the DNSSEC-related resource records for each of the more than one specific sub-FQDN; and verifying a chain of trust of the DNSSEC-related resource records.

10. The validating DNSSEC-aware DNS client of claim 9, wherein the validating DNSSEC-aware DNS client is a stub resolver or a recursive resolver.

11. The validating DNSSEC-aware DNS client of claim 9, wherein the more than one specific sub-FQDN comprises a second-level domain, a top-level domain, and a root.

12. The validating DNSSEC-aware DNS client of claim 10, wherein the DNSSEC-related resource record comprises a set of resource records (RRset) that comprises a public key portion of a zone signing key (ZSK) and a public key portion of a key signing key (KSK), a resource record signature (RRSIG) record for a DNSKEY RRset, and a delegation signer (DS) record that comprises a hash of a DNSKEY record and a corresponding RRSIG record.

13. The validating DNSSEC-aware DNS client of claim 12, wherein the validating further comprises verifying the RRSIG record for the DNSKEY RRset for the DNSSEC-related resource record with the public key portion of the ZSK and verifying the RRSIG record for the DNSKEY RRset with the public key portion of the KSK.

14. The validating DNSSEC-aware DNS client of claim 12, wherein the validating comprises a piped verification of the DS records by a mean of the public key portion of the KSK to rebuild the chain of trust.

15. The validating DNSSEC-aware DNS client of claim 13, further comprising caching the DNSKEY RRset and corresponding RRSIG records and the DS record into a separate and specific lookup cache of the DNSSEC-aware DNS client.

16. The validating DNSSEC-aware DNS client of claim 9, wherein the more than one specific sub-FQDN comprises a sequence of non-partial sub-FQDNs obtained from left to right to a root zone.

17. A non-transitory computer readable storage medium comprising instructions for causing one or more processors to perform a parallelized method for authenticating a domain name system (DNS) query using domain name system security extensions (DNSSEC), the method comprising:

obtaining, at a validating DNSSEC-aware DNS client, a DNS query for a resource record for a fully qualified domain name (FQDN);

segmenting the FQDN into more than one specific sub-FQDN;

providing, in parallel, a DNS query for a DNSSEC-related resource record for each of the more than one specific sub-FQDN to a respective authoritative name server or recursive resolver;

obtaining, in parallel, the DNSSEC-related resource record for each of the more than one specific sub-FQDN;

validating, in parallel, the DNSSEC-related resource record for each of the more than one specific sub-FQDN;

combining each of the DNSSEC-related resource records for each of the more than one specific sub-FQDN; and verifying a chain of trust of the DNSSEC-related resource records.

18. The non-transitory computer readable storage medium of claim 17, wherein the DNSSEC-related resource record comprises a set of resource records (RRset) that comprises a public key portion of a zone signing key (ZSK) and a public key portion of a key signing key (KSK), a resource record signature (RRSIG) record for a DNSKEY RRset, and a delegation signer (DS) record that comprises a hash of a DNSKEY record and a corresponding RRSIG record.

19. The non-transitory computer readable storage medium of claim 18, wherein the validating further comprises verifying the RRSIG record for the DNSKEY RRset for the DNSSEC-related resource record with the public key portion of the ZSK and verifying the RRSIG record for the DNSKEY RRset with the public key portion of the KSK.

20. The non-transitory computer readable storage medium of claim 17, wherein the more than one specific sub-FQDN comprises a sequence of non-partial sub-FQDNs obtained from left to right to a root zone.

* * * * *